United States Patent [19]
Staats et al.

[11] Patent Number: 5,940,600
[45] Date of Patent: Aug. 17, 1999

[54] ISOCHRONOUS CHANNEL HAVING A LINKED LIST OF BUFFERS

[75] Inventors: Erik P. Staats, Brookdale; Robin D. Lash, Milpitas, both of Calif.

[73] Assignee: Apple Computer, Inc., Cupertino, Calif.

[21] Appl. No.: 08/625,993

[22] Filed: Apr. 1, 1996

[51] Int. Cl.$^6$ ................................................. G06F 13/00
[52] U.S. Cl. ......................... 395/287; 395/285; 395/280; 395/306; 395/309
[58] Field of Search .................. 395/287, 250, 395/280, 306, 308, 800, 401, 200, 876, 309, 200.63; 370/56, 79, 91, 465, 395, 424

[56] References Cited

U.S. PATENT DOCUMENTS

| | | | |
|---|---|---|---|
| 5,317,692 | 5/1994 | Ashton et al. | 395/200 |
| 5,406,559 | 4/1995 | Edem et al. | 370/91 |
| 5,440,556 | 8/1995 | Edem et al. | 370/79 |
| 5,452,420 | 9/1995 | Engdahl et al. | 395/285 |
| 5,566,169 | 10/1996 | Rangan et al. | 370/56 |
| 5,594,732 | 1/1997 | Bell et al. | 370/401 |
| 5,594,734 | 1/1997 | Worsley et al. | 370/395 |
| 5,617,418 | 4/1997 | Shirani et al. | 370/465 |
| 5,668,811 | 9/1997 | Worsley et al. | 370/424 |
| 5,754,789 | 5/1998 | Nowatzyk et al. | 395/200.63 |
| 5,815,678 | 9/1998 | Hoffman et al. | 395/309 |

OTHER PUBLICATIONS

ISO/IEC 13213 ANSI/IEEE Standard 1212, "Information Technology — Microprocessor Systems — Control and Status Registers (CSR) Architecture For Microprocessor Buses", First Edition, pp. 1–125, (Oct. 5, 1994).

Philips Electronics et al, Digital Interface for Consumer Electronic Audio/Video Equipment Draft Version 2.0, IEEE 1394 Trade Association Meeting, pp. 1–47, Part 2 –pp. 1–6, (Oct. 1995).

High Performance Serial Bus Working Group of the Microprocessor and Microcomputer Standards Committee, "P1394 Standard for a High Performance Serial Bus", P1394 Draft 8.0v3, pp. 1–364, (Oct. 16, 1995).

Apple Computer, Inc., "Interim Draft, Designing PCI Cards and Drivers for Power Macintosh Computers", A8 Draft — Preliminary Information, pp. 1–372, (Mar. 9, 1995).

*Primary Examiner*—Glenn A. Auve
*Assistant Examiner*—Eric S. Thlang
*Attorney, Agent, or Firm*—Blakely, Sokoloff, Taylor & Zafman

[57] ABSTRACT

A computer system consists of a plurality of nodes, each with an associated local host, coupled together with a plurality of point-to-point links. An isochronous data channel is established within the computer system between a first subset of the plurality of nodes. The isochronous data channel includes a linked list of buffers which are used as temporary storage locations for data transmitted on the isochronous data channel. Each node which is part of the isochronous data channel is configured as a sender or a receiver and data transmissions are commenced. The presence of isochronous data in the channel generates an interrupt which signals a central processing unit (CPU) that data is available. The data is transferred to an associated location within the linked list of buffers and the CPU then moves on to other tasks. In other embodiments, data is transferred using DMA techniques rather than interrupt driven events. Buffers can also be used to transmit isochronous data.

11 Claims, 4 Drawing Sheets

ISOCHRONOUS CHANNEL HAVING A LINKED LIST OF BUFFERS

FIELD OF THE INVENTION

This invention relates generally to data communications and, more particularly, to data communications within a computer bus architecture.

BACKGROUND

The components of a computer system are typically coupled to a common bus for communicating information to one another. Various bus architectures are known in the prior art, and each bus architecture operates according to a communications protocol that defines the manner in which data transfer between components is accomplished.

The Institute of Electrical and Electronic Engineers (IEEE) has promulgated a number of different bus architecture standards including IEEE standards document 1394, entitled *Standard for a High Performance Serial Bus* (hereinafter "IEEE 1394 Serial Bus Standard"). A typical serial bus having the IEEE 1394 standard architecture is comprised of a multiplicity of nodes that are interconnected via point-to-point links, such as cables, that each connect a single node of the serial bus to another node of the serial bus. Data packets are propagated throughout the serial bus using a number of point-to-point transactions, wherein a node that receives a packet from another node via a first point-to-point link retransmits the received packet via other point-to-point links. A tree network configuration and associated packet handling protocol ensures that each node receives every packet once. The serial bus of the IEEE 1394 Serial Bus Standard may be used as an alternate bus for the parallel backplane of a computer system, as a low cost peripheral bus, or as a bus bridge between architecturally compatible buses.

A communications protocol of the IEEE 1394 Serial Bus Standards specifies two primary types of bus access: asynchronous access and isochronous access. Asynchronous access may be either "fair" or "cycle master". Cycle master access is used by nodes that need the next available opportunity to transfer data. Isochronous access is used by nodes that require guaranteed bandwidth, for example, nodes transmitting video data. The transactions for each type of bus access are comprised of at least one "subaction", wherein a subaction is a complete one-way transfer operation.

In the case of isochronous data transfers and computer systems conforming to the IEEE 1394 Serial Bus Standard, the prior art has attempted to manage the flow of data using dedicated drivers. Drivers are software entities associated with various components of a computer system and, among other functions, operate to configure the components and allow the components to be operable within the overall system. The drivers of the prior art have allowed for the transmission of video data from a digital video camera to a monitor, but have not allowed for real time video transmissions in a multi-tasking environment. In particular, the drivers of the prior art have required that a bus controller, e.g., the computer system's CPU, listen to a data channel at the exclusion of all other processes. As data arrives on the channel, it is stored in a buffer for later transmission to a frame buffer associated with a monitor. A new listen instruction must be issued for each separate isochronous data transmission. That is, if a single transmission corresponds to data for a single scan line of the monitor, for a display of five scan lines, five separate listen instructions are required. Because the data is being sent in real time, this system requires that the processor spend all of its time servicing the isochronous data transmissions, even if no data is currently being transmitted on the bus, without servicing any other tasks. It would, therefore, be desirable to have a means and method for a more efficient management of isochronous data channels in a computer system.

SUMMARY OF THE INVENTION

A computer implemented method of managing isochronous data channels in a computer system is described. In one embodiment, the computer system conforms to the IEEE 1394 Serial Bus Standard. An isochronous channel is established within the computer system and includes a linked list of buffers. The linked list of buffers corresponds to display locations on a display which is part of the computer system. Once the linked list of buffers has been established, the computer system executes instructions which allow for the transmission of isochronous data across the channel. Each time a sender node, a video camera in one embodiment, is ready to transmit data, an interrupt is generated which causes the processor to execute instructions to manage the flow of data from the sender. The processor transfers the data transmitted by the camera to a storage location within the linked list of buffers. Ultimately, this data is transferred to a frame buffer associated with a display. This interrupt driven management allows the processor to perform other tasks when no data is being transmitted over the isochronous channel.

In another embodiment, the data transfer is DMA driven rather than interrupt driven. For this embodiment, the isochronous channel, including the linked list of buffers, is established and the process is initiated. Data transmitted by the video camera is transferred to memory locations within the linked list of buffers by the DMA hardware and then ultimately transferred to a frame buffer for display.

In yet another embodiment, the central processing unit (CPU) for the computer system establishes an isochronous channel between a sender node and one or more receiver nodes, not including the CPU itself. For this embodiment, no linked list of buffers is required as data from the sender node is transferred directly to the receiver node.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
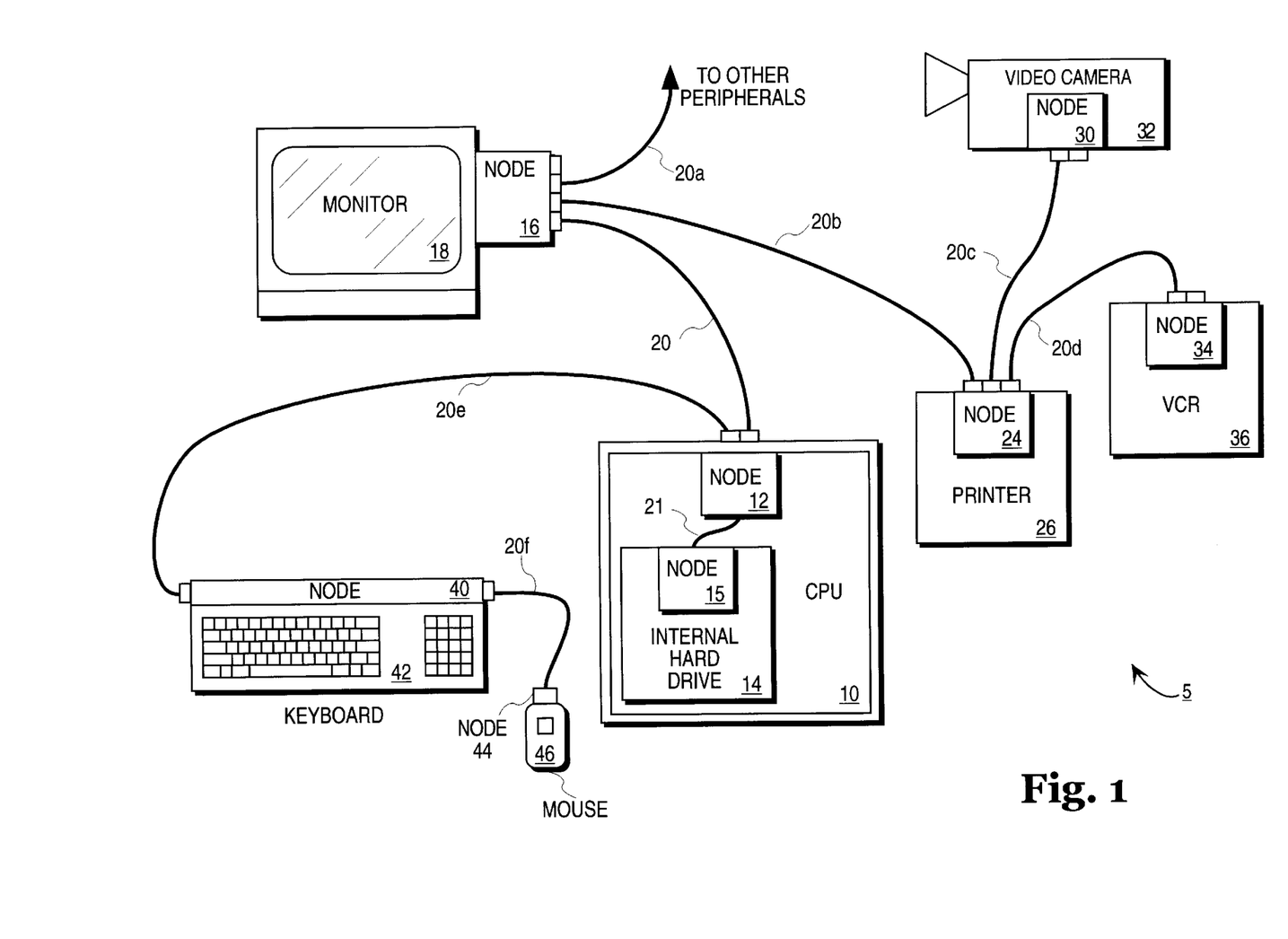
FIG. 1 illustrates a computer system having a serial bus made up of a number of nodes.

As described herein, a method and apparatus for managing isochronous data channels in a computer system is provided. FIG. 1 shows a computer system 5 utilizing a serial bus incorporating the methods and apparatus of the present invention. The serial bus may generally be constructed in accordance with the IEEE 1394 Serial Bus Standard.

The computer system 5 of FIG. 1 comprises a central processing unit (CPU) 10, a monitor 18, a printer 26, a video camera 32, a video cassette recorder (VCR) 36, a keyboard 42, and a mouse 46. The CPU 10 includes an internal hard drive 14 and a memory (not shown). Each of the devices of the computer system is coupled to a local node of the serial bus. In general, the device to which a node is coupled acts as the "local host" for that node. For example, the CPU 10 is the local host for the CPU node 12; the monitor 18 is the local host for the monitor node 16; the printer 26 is the local host for the printer node 24; the video camera 32 is the local host for the video camera node 30; the VCR 36 is the local host for the VCR node 34; the keyboard 42 is the local host for the keyboard node 40; the mouse 46 is the local host for the mouse node 44; and the internal hard drive 14 is the local host for the internal hard drive node 15. Those skilled in the art will appreciate that it is not always necessary for every node to have a local host, nor is it necessary that the local host always be powered.

A point-to-point link such as cable 20 is used to connect two nodes to one another. CPU node 12 is coupled to internal hard drive node 15 by an internal link 21, to monitor node 16 by cable 20, and to keyboard node 40 by a cable 20e. The keyboard node 40 is coupled to the mouse node 44 by a cable 20f. The monitor node 16 is coupled to the nodes of the other peripherals (not shown) by cable 20a and to the printer node 24 by cable 20b. The printer node 24 is coupled to the video camera node 30 by cable 20c and to the VCR node 34 by cable 20d. Each of the cables 20–20f and the internal link 21 may be constructed in accordance with the IEEE 1394 Serial Bus Standard and may include a first differential signal pair for conducting a first signal, a second differential signal pair for conducting a second signal, and a pair of power lines.

Each of the nodes 12, 15, 16, 24, 32, 34, 40 and 44 may have identical construction, although some of the nodes, such as mouse node 44, can be simplified because of their specific functions. Thus, the nodes can be modified to meet the needs of a particular local host. For example, each node may have one or more ports, the number of which is dependent upon its needs. For example, CPU node 12, as illustrated, has 3 ports, while the mouse node 44 has only 1 port.

Figure 2:
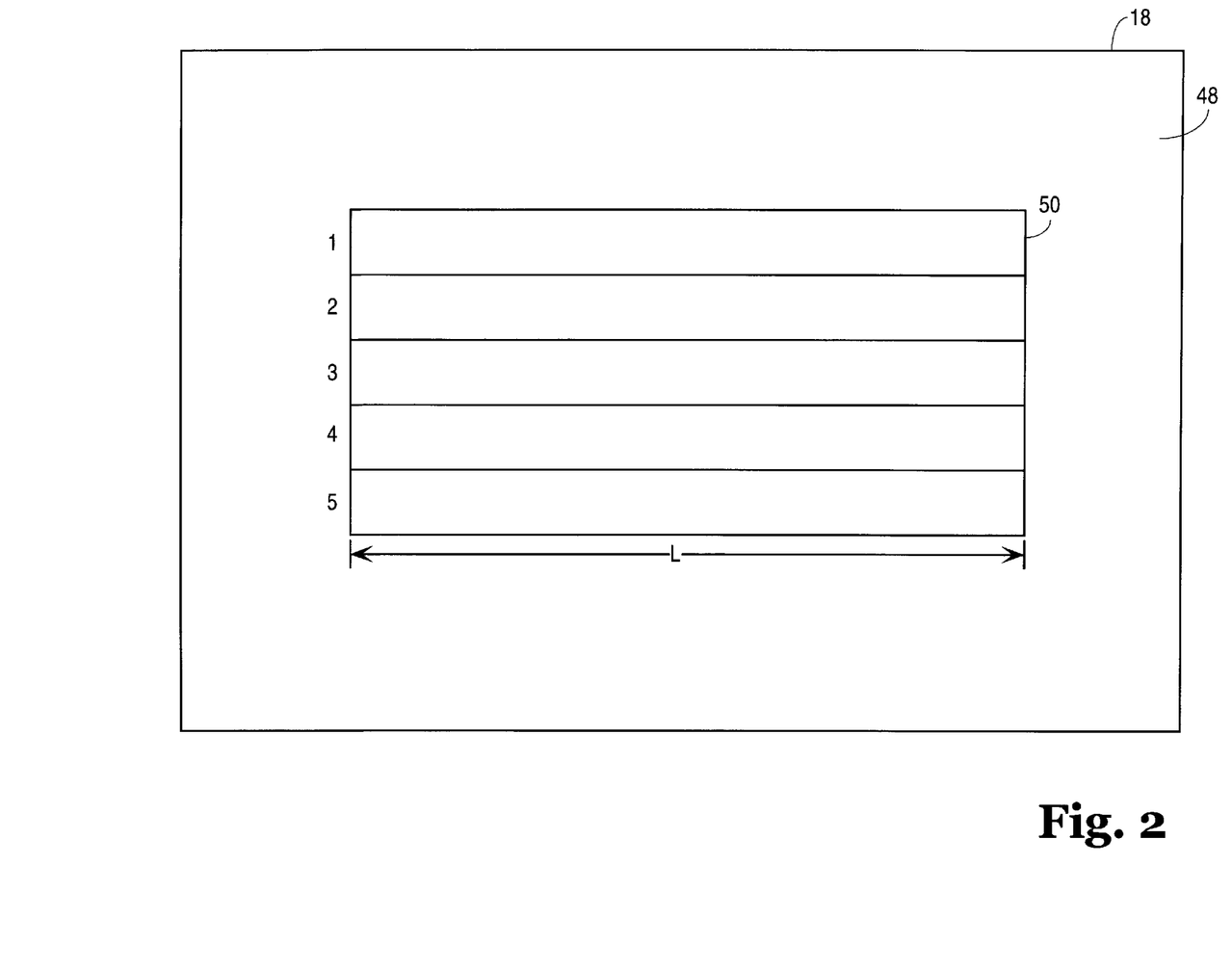
FIG. 2 shows a display screen of a monitor of a computer system having an open window for the display of video information.

Referring now to FIG. 2, one example of the transfer of isochronous data within computer system 5 will be described. Upon review of the entire specification, those skilled in the art will appreciate that this example is used to describe the methods of the present invention and is only one of many applications of the process described below. FIG. 2 shows the display screen of monitor 18. Within display screen 48, a window 50 is shown. Window 50 is implemented using programming techniques well known in the art and is used for the display of real-time video data in accordance with the methods of the present invention. In particular, window 50 defines the boundary within which the real-time video data will be displayed on display screen 48. As shown in FIG. 2, window 50 consists of five scan lines, each having an arbitrary length L. Those skilled in the art will appreciate that window sizes of other dimensions could be used.

In general, window 50 will be generated by an application program running on computer system 5. An example of such an application program is the QuickTime® program available from Apple Computer, Inc. of Cupertino, Calif. In such a case, computer system 5 may comprise the familiar Macintosh® computer system also available from Apple Computer, Inc. The video data to be displayed in window 50 on display screen 48 will generally be obtained from a frame buffer (not shown) associated with monitor 18. The techniques for displaying data stored in a frame buffer on the display screen of a monitor are well-known in the art.

In accordance with the methods of the present invention, real-time video data from video camera 32 is to be displayed within window 50 on display screen 48. The real-time video data generated by video camera 32 will comprise isochronous data packets in accordance with the IEEE 1394 Serial Bus Standard. Each of these isochronous data packets will include header information and payload information. The header information is used for routing the video data to the monitor 18 and for error detection and correction. The payload data comprises the video data to be displayed within window 50.

As indicated above, the prior art has attempted to manage this flow of isochronous data from video camera 32 to monitor 18 as follows. Once the application program has generated window 50 within display screen 48, CPU 10 executes instructions which cause it to listen on one of its associated ports. These instructions are typically stored on hard drive 14 and are loaded into system memory (not shown) upon initialization. When the video camera 32 has data to transmit, the video camera node 30 generates the isochronous data packets and transmits them over the serial bus in accordance with the IEEE 1394 Serial Bus Standard. CPU node 12 detects the presence of the isochronous data packets and strips the payload information from these packets. The payload information is placed in a buffer in the computer memory for later transmission to the frame buffer associated with monitor 18. If, for example, one transmission from video camera node 30 corresponded to data for a single scan line of window 50, five separate listen operations would be required to receive the video data associated with one frame to be displayed within window 50. To accommodate the real-time transmission nature of the video data, CPU 10 would be required to constantly listen to the bus for isochronous data transmissions from video camera node 30. That is, CPU 10 could not undertake to execute additional tasks, for example menu level tasks, as is common in multi-tasking environments.

Figure 3:
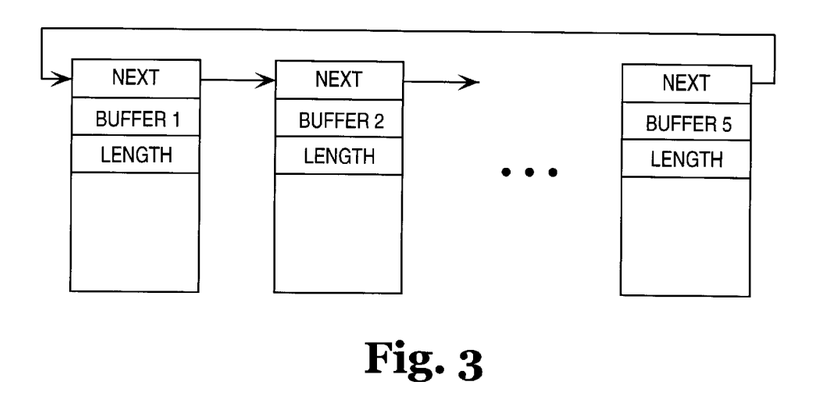
FIG. 3 shows a linked list of buffers in accordance with one embodiment.

To overcome this problem of the prior art, the present invention uses a linked list of buffers such as those shown in FIG. 3. FIG. 3 shows a linked list of buffers which reside in computer memory. In keeping with the above described example, five buffers comprise the linked list, one for each scan line of window 50. Each of the buffers contains a pointer, next, which points to the address of the following buffer in the linked list. It will be appreciated that these addresses correspond to memory locations within computer system 5. Each of the buffers also contains an address "buffer n". This address corresponds to the start of a scan line of window 50. The address of buffer 1 corresponds to the start of scan line 1 and so on. Each of the buffers in the linked list also contains a length parameter which corresponds to the scan line length of window 50.

An exemplary structure of these isochronous channel buffers is shown below:

| | | |
|---|---|---|
| typedef | struct IsochChannelBufferStruct | IsochChannelBuffer *IsochChannelBufferPtr; |
| struct | IsochChannelBufferStruct | |
| { | | |
| | IsochChannelBufferPtr | pBranchChannelBuffer; |
| | Ptr | buffer |
| | UInt32 | length; |
| }; | | |
| | pBranchChannelBuffer | Branch pointer to next channel buffer. When a branch condition is met, its corresponding branch pointer is used to select the next buffer. |
| | buffer | Pointer to buffer memory. |
| | length | Length of above buffer. |

The linked list of buffers corresponds to a particular isochronous channel. The isochronous channel is identified by a channel identification number (channel ID). The channel ID is maintained in a data record stored in the computer system 5 memory and is used by the various application programs and driver routines as described below. The use of a common channel ID allows the interoperation of application programs, driver routines, and other software routines which otherwise may not be capable of operating together.

One example of the use of a linked list of buffers according to the methods of the present invention as shown in FIG. 3 will now be described. The example is presented with reference to process 100 illustrated in FIG. 5 and assumes that real-time video data is to be transmitted from camera 32 and displayed within a window 50 on monitor 18. To accommodate the transmission of the real-time video (i.e., isochronous) data, at step 102 an application program running on computer system 5 issues instructions which cause CPU 10 to create an isochronous data channel identified by "channel ID".

Upon receiving the instruction to create the isochronous channel ID, the CPU 10 will execute instructions to create such a channel. This may include a channel bandwidth and a preferred speed. An exemplary instruction is shown below.

| | | |
|---|---|---|
| OSStatus | AllocateIsochronousChannelID | ( |
| | IsochChannelID | *pIsochChannelID, |
| | UInt32 | bandwidth, |
| | UInt32 | preferredSpeed); |
| <-- | pIsochChannelID | Returned reference to this channel for use in subsequent isochronous service calls. |
| --> | bandwidth | Bandwidth required for this channel. |
| --> | preferredspeed | Preferred speed for this channel. |

This instruction creates an isochronous channel ID that is used by the various isochronous service routines described below. The channel is initialized with the required bandwidth and the preferred speed. The actual channel speed may be less than the preferred speed depending on the maximum speed of the devices that are later attached to the channel. The isochronous channel is a data path between nodes which will be added as channel clients as described below.

Once a channel has been established, the application program can issue instructions in order to add interested clients to the isochronous channel specified by channel ID. These clients are typically software driver routines associated with the devices, such as video camera 32, which take part in the display of the real-time video data to be transferred. The client software will take part in and be notified of all events associated with the given isochronous channel specified by the channel ID. Accordingly, at step 104, the application program instructs the driver associated with video camera 32 to send real-time video data over the channel identified by "channel ID" and display the data within window 50 on monitor 18.

In response to the instructions issued by the application program, the camera driver will configure the camera 32 such that the camera 32 will transmit video data over the channel specified by "channel ID". The camera driver will also establish a linked list of buffers, as described above, and assign the buffers to "channe lID". The linked list of buffers will act as storage locations for the video data to be transmitted by camera 32.

An exemplary instruction for adding clients to "channel ID" is shown below

| | | |
|---|---|---|
| OSStatus | AddIsochronousChannelClient | ( |
| | IsochChannelID | isochChannelID, |
| | DriverID | driverID, |
| | Boolean | clientIsTalker); |
| --> | isochChannelID | Reference to the isochronous channel to add the given client to. |
| --> | driverID | Reference to the driver client to add to the given channel. |
| --> | clientIsTalker | If the given client will be a sender node (i.e., a node that will be "doing the talking" in IEEE 1394 parlance) this should be set to true. Otherwise it should be set to false (i.e., if the node will be a listener). |

This instruction adds the driver specified by "DriverID" as a client to the isochronous channel specified by IsochChannel ID". The client will be called to perform its role in initializing, starting and stopping the given isochronous channel. The client will also be informed of all channel events such as bus resets.

Figure 5:
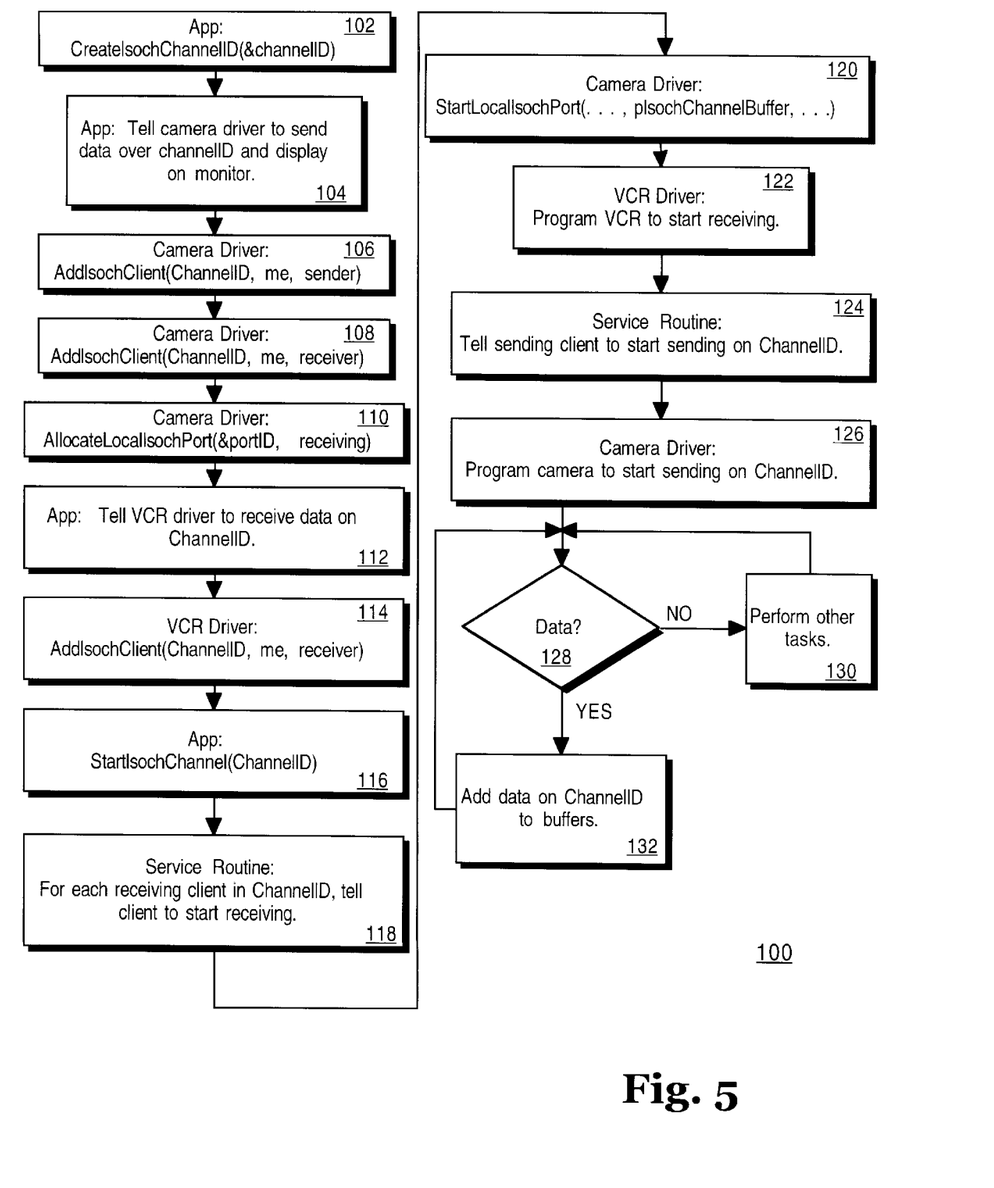
FIG. 5 is a flow diagram illustrating the management of an isochronous data channel in a computer system according to one embodiment.

For the example of FIG. 5, at step 106 the video camera driver adds the video camera as a sender client for the isochronous channel specified by channel ID. Then, at step 108, the camera is added as a receiver (listener) client of the channel specified by channel ID. The camera driver is added as both a talker and a listener so that the driver can both start the camera sending data and set up the CPU to receive the data for display.

Next, at step 110, the camera driver sets up the linked list of buffers described above. Once this is accomplished, a port on CPU node 12 can be set to listen to the isochronous channel. An exemplary routine for this procedure is shown below.

| | | |
|---|---|---|
| OSStatus | AllocateLocalIsochronousPort ( | |
| | ReferenceID | referenceID, |
| | IsochPortID | *pIsochPortID, |
| | UInt32 | channelNum, |
| | UInt32 | speed, |
| | Boolean | talking); |
| --> | referenceID | Reference used to indicate which node to allocate port on. |
| <-- | pIsochPortID | Returned reference to this port for use in subsequent port service calls. |
| --> | channelNum | Channel number for this port. |
| --> | speed | Speed for this port. |
| --> | talking | If false, allocate a port for listentiing, otherwise allocate a port for talking. |

FIG. 5 illustrates the case where a user also wishes to record video data transmitted by camera 32 for a later playback. To accomodate this, at step 112 the application program issues instructions to establish the VCR driver as a receiver client of the channel specified by "channel ID". In response, the VCR driver adds itself as a channel client at step 114.

Once all of the clients have been added to the isochronous channel specified by channel ID, a start instruction can be issued at step 116. This instruction, an example of which is given below, calls all of the given isochronous channel's clients (i.e., the driver software associated with the various devices) to start the given isochronous channel. Each listening client is first instructed to listen to the channel. Once all of the listeners are ready, the sender client is instructed to start the transmission of data.

```
OSStatus    StartIsochronousChannel (
IsochChannelID         isochChannelID);
-->  isochChannelID    Reference to the isochronous channel to start.
```

As shown in FIG. 5 then, once the start command is issued by the application program, a service routine calls each channel client at step 118. At step 120, the camera driver configures the local port on CPU node 12 to start listenting to the isochronous channel specified by channel ID. An exemplary instruction is shown below.

```
OSStatus    StartLocalIsochronousPort (
    IsochPortActionParamsPtr    pIsochPortActionParams);
<-->  pIsochPortActionParams    Pointer to parameter block.
    -->  controlFlags           Flags used to control the request.
    <--  status                 Current status of request.
    -->  completionProc         Procedure to call upon completion of
                                request.
    -->  completionProcData     Data to be used by completionProc.
    -->  isochPortID            Reference to local port to start.
    -->  pIsochChannelBuffer    Isochronous channel buffer chain to
                                talk/listen into/from.
    -->  actionSync             Sync event to start on.
```

This instruction causes the local port specified by isochPortID to start listening (for the example of FIG. 5) on its isochronous channel using the buffer chain previously established and specified by pisochChannelBuffer (i.e., the starting address of Buffer 1 in FIG. 3).

Similarly, at step 122 the VCR driver programs the VCR 36 to start listening to the isochronous channel specified by channel ID. Once this is completed, the service routine issues instructions telling the camera driver to program camera 32 to start sending data over the isochrounous channel. At step 126, the camera driver does so.

At this point, CPU 10 may continue with other instructions as indicated by step 130. For example, CPU 10 may respond to menu level instructions initiated by a user or execute commands for a selected foreground application. When video camera 32 transmits data on the isochronous channel specified by a channel ID, the CPU receiving the data generates an interrupt. The interrupt is recognized at step 128 and procedure 100 moves to step 132 where the interrupt causes the CPU 10 to execute instructions which transfer the incoming isochronous data into an appropriate buffer within the linked list. The CPU 10 then returns from the interrupt to complete or continue with any tasks. For the second embodiment described above, a DMA transfer is initiated to transfer the data without interrupting the CPU 10. Subsequently, data is transferred from the buffers which comprise the linked list to a frame buffer associated with monitor 18 for eventual display on display screen 48 within window 50. This process continues until an isochronous channel stop instruction is issued.

Stopping the transmission of isochronous data is similar to the starting process. This time, however, a stop command is issued which calls all of the given channel's clients as follows. First, the stop command calls the sending client to stop sending data on the channel. Once the sender stops, the stop command calls each of the listening clients to stop listening.

Those skilled in the art will recognize that the simple linked list configuration shown in FIG. 3 is subject to certain errors. For example, the linked list shown in FIG. 3 has buffer 1 corresponding to scan line 1 of window 50, buffer 2 corresponding to scan line 2 of window 50, and so on. Under normal operating conditions, the real-time video data intended for the top of the frame in window 50 will be stored in buffer 1, corresponding to scan line 1. Typically, the top-of-frame (ToF) data is tagged to indicate it as such. However, when errors in the video data stream occur, for example a garbled transmission, using the linked list approach of FIG. 3 it is possible that one line worth of data could be missed and, for example, the top-of-frame data could then be placed in the buffer corresponding to scan line 5. In such a case, the ultimate picture displayed within window 50 would appear with the top-of-frame data at the bottom of the screen instead of the top of the screen. Such a condition is generally unacceptable.

Figure 4:
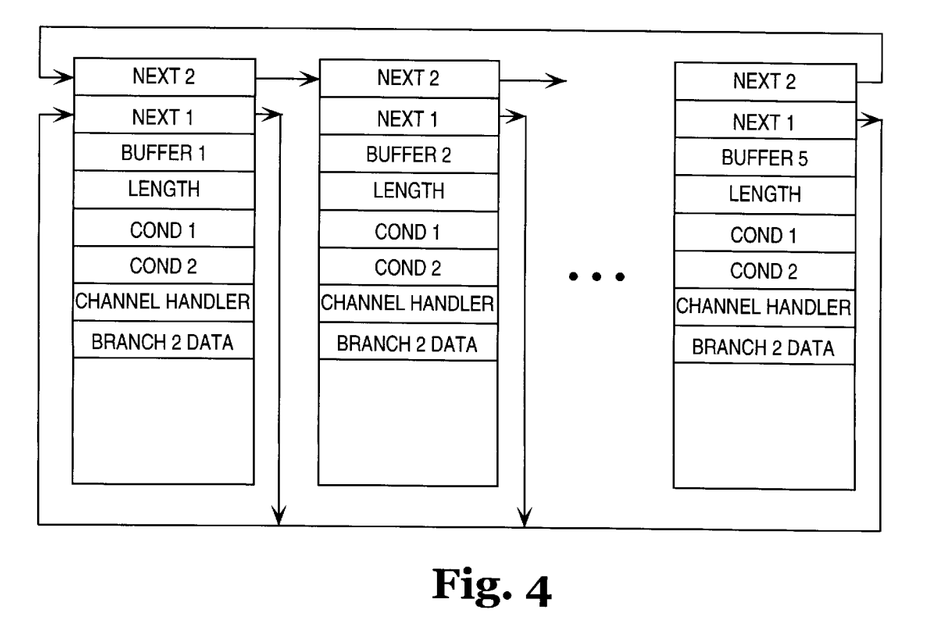
FIG. 4 shows a linked list of buffers which support conditional branching according to one embodiment.

To account for these types of errors, a more complex linked list of buffers is used. This more complex scheme is shown in FIG. 4. The linked list of buffers shown in FIG. 4 support conditional branching. That is, the linked list contains pointers which do not necessarily correspond to the succeeding buffer in the chain. Instead, the linked list supports pointers (next1) which point back to the first address of the first buffer in the linked list (or, potentially, any other buffer, as desired and depending upon the branch condition described below). Associated with the pointer next1 is a data field cond1. The data field cond1 may, for example, correspond to a top-of-frame indication. Thus, when real-time video data is received over the isochronous channel, if the data indicates that it is meant for the top-of-frame in window 50, the linked list will point to the starting address of the buffer associated with scan line 1. In this way, top-of-frame data will always be displayed at the top of window 50.

Where the video data received does not have a top-of-frame indication, the linked list will point to the next buffer in the chain. In this way, the situation described above where the data is displayed with the top-of-frame at the bottom of the window is avoided. Those skilled in the art will appreciate that other branching conditions, such as branch on fill or branch on synch, can also be implemented.

An exemplary structure of these isochronous channel buffers is shown below:

```
typedef struct IsohChannelBufferStruct    IsochChannelBuffer
                                          *IsochChannelBufferPtr;
structIsochChannelBufferStruct
{
    IsochChannelBufferPtr    pBranch1ChannelBuffer;
```

```
    IsochChannelBufferPtr            pBranch2ChannelBuffer;
    Ptr                              buffer;
    UInt32                           length;
    UInt32                           offset;
    UInt32                           status;
    UInt32                           branch1Conditionals;
    UInt32                           branch1Data;
    UInt32                           branch1State;
    UInt32                           branch2Conditionals;
    UInt32                           branch2Data;
    UInt32                           branch2State;
    IsochChannelHandlerProcPtr       isochChannelHandler;
    UInt32                           isochChannelHandlerData;
};
    pBranch1ChannelBuffer            Branch1 pointer to next channel
                                     buffer. When a branch condition is
                                     met, its corresponding branch pointer
                                     is used to select the next buffer. If
                                     both branch conditions are met
                                     simultaneously, branch1 will take
                                     precedence.
    pBranch2ChannelBuffer            Branch2 pointer to next channel
                                     buffer.
    buffer                           Pointer to buffer memory.
    length                           Length of above buffer.
    offset                           Current offset into above buffer.
    status                           Status of this buffer.
    branch1Conditionals              Conditions to meet to take branch1.
    branch1Data                      Data to use to further specify
                                     branch1 conditions.
    branch1State                     Current state of branch1 conditions.
    branch2Conditionals              Conditions to meet to take branch2.
    branch2Data                      Data to use to take branch2
                                     conditions.
    branch2State                     Current state of branch2 conditions.
    isochChannelHandler              Handler to call when a branch is
                                     taken.
    isochChannelHandlerData          Data for above handler to use for its
                                     own purposes.
```

The channel handler field within each of the buffers of the linked list provides a means of accommodating data conversion. For example, video camera 32 may transmit video data in YUV format However, monitor 18 may require the data in RGB format. Thus, a conversion would be required to change the YUV data to RGB data before display. The channel handler can be a set of software instructions to be called whenever a particular channel branch is taken so that after a buffer is filled, the data stored in the buffer can be converted from YUV data to RGB data for display. Thus, the channel handler would specify an address which corresponds to instructions for performing a conversion routine.

Another example of when such a channel handler may be required is when compressed data is being transmitted over the serial bus. Before display, the data would need to be decompressed. The channel handler routine could be used to decompress the data in the manner described for the YUV to RGB translation described above. Other examples of the use of such channel handlers will be apparent to those skilled in the art.

Thus far, the present invention has been described with the assumption that the CPU 10 will manipulate data transferred across the isochronous channel (i.e., the CPU transfers the data to the linked list of buffers within system memory for later transfer to a frame buffer). This need not, however, be the case. In other embodiments, the CPU 10 can establish the isochronous channel without becoming part of the channel. For example, in the situation where a user wishes to record video data produced by camera 32 on a video cassette, the isochronoucs channel can be established between only video camera 32 and VCR 36. In this example, one driver might be associated with the video camera 32 and a second driver might be associated with the VCR 36. The camera driver would establish the channel ID and add the camera 32 as a sender client in the manner described above. The camera driver would then call the VCR driver and would pass a reference to the channel ID. The VCR driver would add the VCR 36 as a listener client as described above. Once all of the clients have been added to the channel, the "start" instruction can be issued as described above. No linked list of buffers is required because the VCR 36 can record the video data directly (it need not be in frames). Now, isochronous data (i.e., video data) will be transmitted from the camera 32 to the VCR 36 without interrupting the CPU 10 (which is not a client of the isochronous channel). Those skilled in the art will appreciate that any number of clients can be added to the isochronous channel in this fashion to accomodate the required data transfer.

Although the methods of the present invention have been described with reference to the use of a linked list of buffers at the receiving node, those skilled in the art will appreciate that a similar configuration of buffers could be used at the sending node. In such an embodiment, isochronous data would be stored in a linked list of buffers similar to that described above and transmitted over the isochronous channel as network conditions permit.

Thus a system and method for managing isochronous data channels within a computer system has been described. In the foregoing specification, the invention has been described with reference to specific exemplary embodiments thereof. It will, however, be appreciated by those skilled in the art that various modifications and changes may be made thereto without departing from the broader spirit and scope of the invention as set forth in the appended claims. The specification and drawings are accordingly, to be regarded in an illustrative rather than a restrictive sense.

What is claimed is:

1. A method comprising:

configuring an isochronous channel within a computer system to include a linked list of buffers configured to receive isochronous data transmitted within said computer system;

adding a sender client configured to transmit said isochronous data to said isochronous channel, said sender client being a software driver routine associated with a sender node of said computer system, and providing said sender client with a channel identifier; and adding a listener client to said isochronous channel, said listener client being a software driver routine associated with a listener node of said computer system, by providing said listener client with said channel identifier.

2. The method of claim 1 further comprising adding said sender client as a further listener client.

3. The method of claim 1 wherein configuring said isochronous channel comprises executing computer readable instructions on a central processing unit of said computer system.

4. The method of claim 1 wherein said isochronous channel comprises a data path within said computer system.

5. The method of claim 1 further comprising transmitting isochronous data from said sender client to said linked list of buffers across said isochronous channel.

6. The method of claim 5 further comprising receiving said isochronous data at said linked list of buffers.

7. The method of claim 6 wherein said receiving comprises interrupting a central processing unit of said computer system and transferring said isochronous data from a port coupled to said central processing unit to said linked list of buffers.

8. A sequence of computer-readable instructions embodied on a computer-readable medium comprising instructions arranged to cause a processor to configure an isochronous channel within a computer system including said processor to include a linked list of buffers configured to receive isochronous data transmitted within said computer system and to cause said processor to add a sender client to said isochronous channel and to cause said processor to add a listener client to said isochronous channel.

9. A computer system, comprising:

an isochronous channel having a linked list of buffers configured to receive isochronous data transmitted within said computer system;

a sender client associated with said isochronous channel and configured to transmit said isochronous data, said sender client being a software driver routine associated with a sender node of said computer system; and a listener client associated with said isochronous channel and configured to receive said isochronous data, said listener client being a software driver routine associated with a listener node of said computer system.

wherein said sender client has an associated channel identifier that is provided to said listener client.

10. The computer system of claim 9 wherein said sender client comprises a further listener client.

11. The computer system of claim 9 wherein said isochronous channel comprises a data path within said computer system.

* * * * *